US012135731B2

(12) United States Patent
Makumbi et al.

(10) Patent No.: US 12,135,731 B2
(45) Date of Patent: Nov. 5, 2024

(54) MONITORING AND ALERTING PLATFORM FOR EXTRACT, TRANSFORM, AND LOAD JOBS

(71) Applicant: Capital One Services, LLC, McLean, VA (US)

(72) Inventors: Alex Makumbi, Burke, VA (US); Andrew Stevens, Leesburg, VA (US)

(73) Assignee: Capital One Services, LLC, McLean, VA (US)

(*) Notice: Subject to any disclaimer, the term of this patent is extended or adjusted under 35 U.S.C. 154(b) by 88 days.

(21) Appl. No.: 17/248,187

(22) Filed: Jan. 13, 2021

(65) Prior Publication Data

US 2022/0222266 A1 Jul. 14, 2022

(51) Int. Cl.
*G06F 16/25* (2019.01)
*G06F 21/31* (2013.01)

(52) U.S. Cl.
CPC .......... *G06F 16/254* (2019.01); *G06F 16/258* (2019.01); *G06F 21/31* (2013.01)

(58) Field of Classification Search
CPC .............................. G06F 16/254; G06F 16/258
See application file for complete search history.

(56) References Cited

U.S. PATENT DOCUMENTS

| | | | | |
|---|---|---|---|---|
| 11,036,560 | B1* | 6/2021 | Mcpherson | G06F 16/254 |
| 2007/0294697 | A1* | 12/2007 | Theimer | G06F 9/5027 |
| | | | | 718/102 |
| 2009/0177671 | A1* | 7/2009 | Pellegrini | G06F 9/5038 |
| 2012/0102007 | A1* | 4/2012 | Ramasubramanian | |
| | | | | G06F 16/254 |
| | | | | 707/705 |
| 2015/0134589 | A1* | 5/2015 | Marrelli | G06F 16/254 |
| | | | | 707/602 |
| 2021/0026611 | A1* | 1/2021 | Bequet | G06F 16/90344 |

OTHER PUBLICATIONS

"Build Amazon Quicksight Dashboard to Monitor Matillion Jobs," Matillion, Jul. 1, 2018 (5 pages) [Retrieved from https://www.matillion.com/resources/blog/build-amazon-quicksight-dashboard-to-monitor-matillion-jobs on Jan. 11, 2021].

* cited by examiner

Primary Examiner — Charles D Adams
(74) Attorney, Agent, or Firm — Harrity & Harrity, LLP

(57) ABSTRACT

In some implementations, a monitoring device may obtain information related to one or more extract, transform, and load (ETL) jobs scheduled in an ETL system. The monitoring device may generate ETL job metrics that include status information, timing information, and data volume information associated with one or more constituent tasks associated with the one or more ETL jobs, wherein the ETL job metrics include metrics related to extracting data records from a data source, transforming the data records into a target format, and/or loading the data records in the target format into a data sink. The monitoring device may enable capabilities to create or interact with one or more dashboards to visualize the ETL job metrics via a workspace accessible to one or more client devices. The monitoring device may invoke a messaging service to publish one or more notifications associated with the ETL job metrics via the workspace.

20 Claims, 6 Drawing Sheets

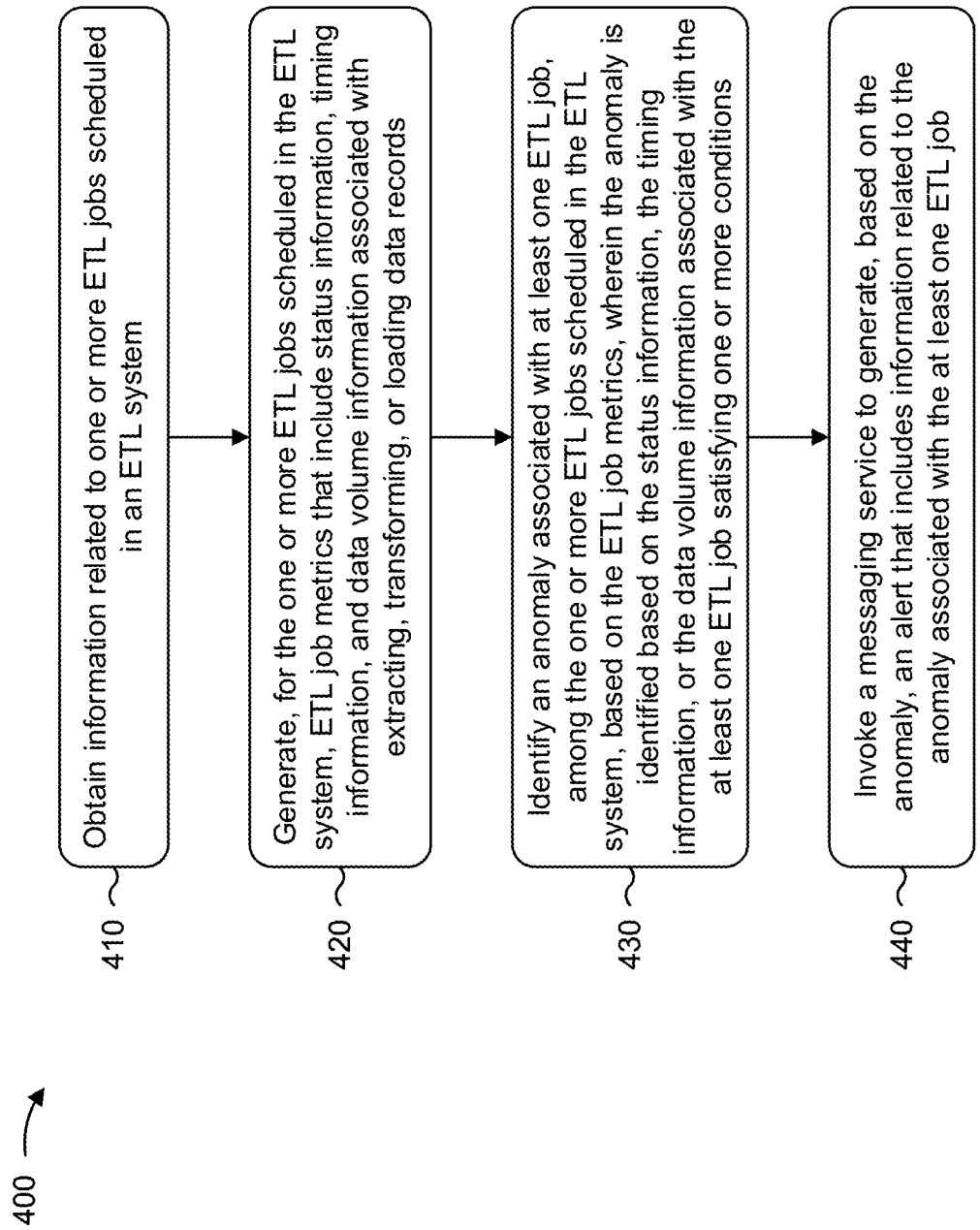

MONITORING AND ALERTING PLATFORM FOR EXTRACT, TRANSFORM, AND LOAD JOBS

BACKGROUND

In computing, extract, transform, and load (ETL) generally refers to procedures to copy data from one or more source systems into one or more destination (or sink) systems that represent the data in a different manner and/or in a different context than the source system(s). For example, in an ETL system, extraction typically includes importing structured and/or unstructured data from homogeneous or heterogeneous data sources, transformation includes processing and converting the data (e.g., using a data cleansing technique) into a format and/or structure that is suitable for querying and further analysis, and loading includes inserting the transformed data into a final target system, such as an operational data store, a data mart, or a data warehouse. Accordingly, an ETL system may be used to integrate data that may be developed and supported by different vendors or hosted on separate computer hardware, enforce data quality and consistency standards such that data from separate sources can be used together, and/or deliver data in a presentation-ready format to enable developers to build applications around the data and/or enable end users to consume or otherwise utilize the data.

SUMMARY

In some implementations, a system for monitoring extract includes one or more memories and one or more processors, communicatively coupled to the one or more memories, configured to: obtain information related to one or more extract, transform, and load (ETL) jobs scheduled in an ETL system, wherein the one or more ETL jobs are each associated with constituent tasks to extract data records from a data source, transform the data records into a target format, and load the data records in the target format into a data sink; generate, for the one or more ETL jobs scheduled in the ETL system, ETL job metrics that include status information, timing information, and data volume information associated with extracting, transforming, or loading data records; identify an anomaly associated with at least one ETL job, among the one or more ETL jobs scheduled in the ETL system, based on the ETL job metrics, wherein the anomaly is identified based on the status information, the timing information, or the data volume information associated with the at least one ETL job satisfying one or more conditions; and invoke a messaging service to generate, based on the anomaly, an alert that includes information related to the anomaly associated with the at least one ETL job.

In some implementations, a method for monitoring extract includes obtaining, by a monitoring device, information related to one or more ETL jobs scheduled in an ETL system; generating, by the monitoring device, ETL job metrics that include status information, timing information, and data volume information associated with one or more constituent tasks associated with the one or more ETL jobs scheduled in the ETL system, wherein the ETL job metrics include metrics related to one or more of extracting data records from a data source, transforming the data records into a target format, or loading the data records in the target format into a data sink; enabling, by the monitoring device, a capability to create or interact with one or more dashboards to visualize data analytics associated with the ETL job metrics via a workspace accessible to one or more client devices; and invoking, by the monitoring device, a messaging service to publish one or more notifications associated with the ETL job metrics via the workspace.

In some implementations, a non-transitory computer-readable medium storing a set of instructions includes one or more instructions that, when executed by one or more processors of a device, cause the device to: obtain information related to one or more ETL jobs scheduled in an ETL system; generate ETL job metrics that include status information, timing information, and data volume information associated with one or more constituent tasks associated with the one or more ETL job scheduled in the ETL system, wherein the status information indicates whether an ETL job or a constituent task associated with an ETL job has a queued status, a running status, a completed status, or a failed status, wherein the time information indicates one or more of a queue time, an execution time, a start time, or completion time for an ETL job or a constituent task associated with an ETL job, and wherein the data volume information indicates a quantity of data records to be extracted, transformed, or loaded or a quantity of data records that have been extracted, transformed, or loaded for an ETL job or a constituent task associated with an ETL job; and enable a capability to create or interact with one or more dashboards to visualize data analytics associated with the ETL job metrics via one or more client devices.

BRIEF DESCRIPTION OF THE DRAWINGS

FIG. 4 is a flowchart of an example process relating to monitoring ETL jobs and alerting based on a status of the monitored ETL jobs.

DETAILED DESCRIPTION

Figure 1A:
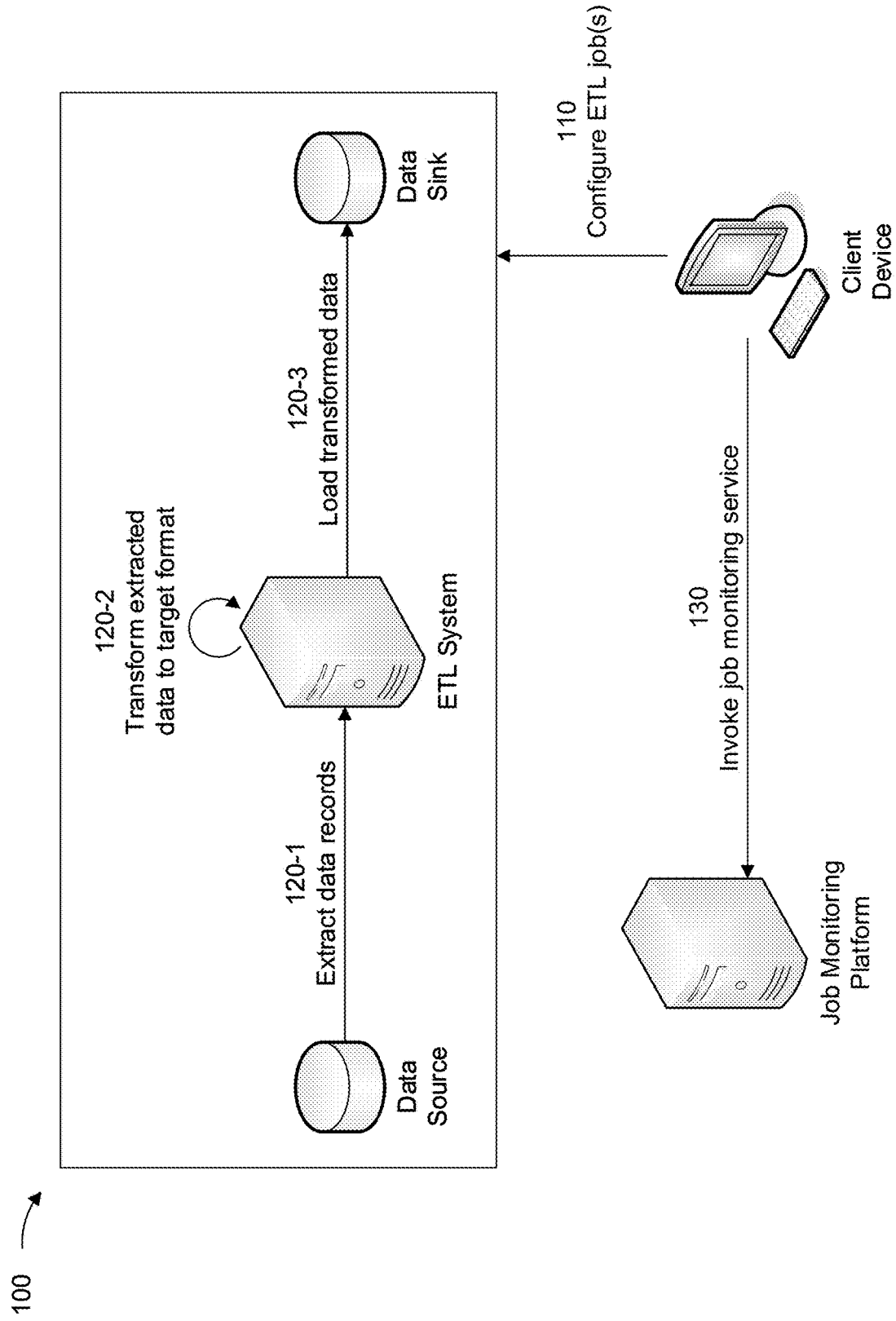
FIGS. 1A-1C are diagrams of an example implementation relating to monitoring extract, transform, and load (ETL) jobs and alerting based on a status of the monitored ETL jobs.

The following detailed description of example implementations refers to the accompanying drawings. The same reference numbers in different drawings may identify the same or similar elements.

Extract, transform, and load (ETL) tools serve an important role in data integration strategies by allowing organizations to gather data from multiple (often heterogeneous) data sources and consolidate the data into a single, centralized location. For example, an ETL tool may be configured to extract raw structured data and/or raw unstructured data from various data sources (e.g., databases, cloud and/or on-premises environments, data warehouses, customer relationship management systems, and/or other sources), transform the raw data into a format compatible with a destination system (e.g., using data cleansing, standardization, deduplication, verification, sorting, and/or other techniques), and then load the transformed data to the destination system for further use. Because an ETL tool is often used to extract, transform, and load large data volumes, the three ETL phases (including sub-phases, or constituent tasks) may execute in a pipeline. For example, while one or more processes are extracting raw data from the data sources, one or more transformation processes may execute to transform raw data that has already been extracted and one or more loading processes may execute to load data that has already been transformed into the destination systems without waiting for the extraction process(es) and/or transformation process(es) to finish.

Accordingly, because the extraction, transformation, and loading processes represent entry barriers for data coming into the destination system, flaws or breakdowns in and/or between any one or more of the extraction process(es), the transformation process(es), and/or the loading process(es) (and/or constituent tasks within any of the ETL phases) are potential points of failure in the ETL pipeline. Furthermore, because many ETL processes are tasked with handling data with different input formats, different data volumes, and/or other variations, failures in the ETL pipeline can result in scenarios where data is not loaded into the destination system, data is loaded into the destination system incorrectly, and/or other scenarios that may result in incomplete data, inaccurate data, and/or stalls in making data available for further use. Accordingly, providing an ETL system that has a capability to monitor all phases of an ETL job at a granular level would be useful to detect potential problems with past, present, and/or future ETL jobs and/or to identify trends that may eventually lead to breakdowns in the ETL pipeline. However, existing ETL tools generally lack built-in monitoring capabilities.

Some implementations described herein relate to a job monitoring platform that can monitor status information related to ETL jobs in an ETL system, generate alerts to inform end users about anomalies and/or trends that are identified based on the monitored status information, and/or enable end users to create and/or interact with dashboards to visualize data analytics that are based on the status information, anomalies, and/or trends via a collaborative workspace. For example, as described herein, each ETL job in the ETL system may include constituent tasks to extract data records from a data source, transform the data records into a target format, and load the data records in the target format into a data sink, and one or more sub-tasks may be included in one or more of the extract, transform, and/or load tasks. Furthermore, as described herein, the various constituent tasks (including sub-tasks) may execute in an ETL pipeline, whereby the job monitoring platform may monitor the status information to derive ETL job metrics that relate to different stages in the ETL pipeline at various levels of granularity (e.g., at a coarse level to capture metrics related to overall jobs and/or groups of jobs, at a more granular level to capture metrics related to the extract, transform, and/or load phases within a job, and/or at a fine level to capture metrics related to individual sub-tasks and/or groups of sub-tasks within one or more of the extract, transform, and/or load phases, among other examples). In some implementations, the job monitoring platform may evaluate the ETL job metrics to identify trends in the status information (e.g., increases or decreases in the number of data records being processed and/or the time to perform a given task or subtask, among other examples) and to generate alerts when anomalies are detected in the ETL job metrics. In this way, the job monitoring platform may provide a capability to monitor all phases of an ETL job at varying levels of granularity, inform users when anomalies are detected in the monitored status information such that the users can remediate potential problems with past, present, and/or future ETL jobs, and/or to identify trends in the monitored status information to prevent breakdowns in the ETL pipeline before the breakdowns occur and/or avoid wasting resources remediating anomalies that represent false positives.

Figure 1B:
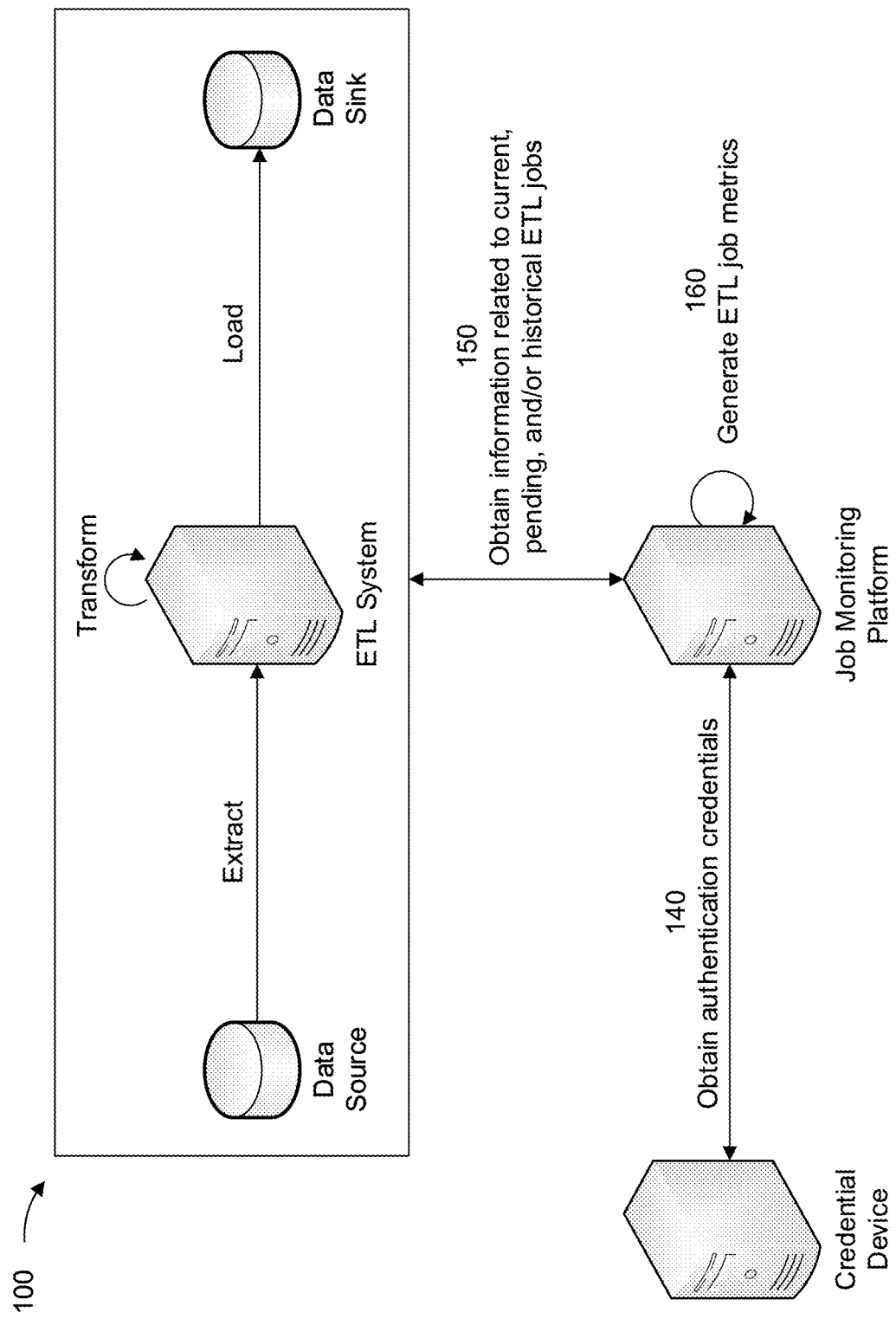
Figure 1C:
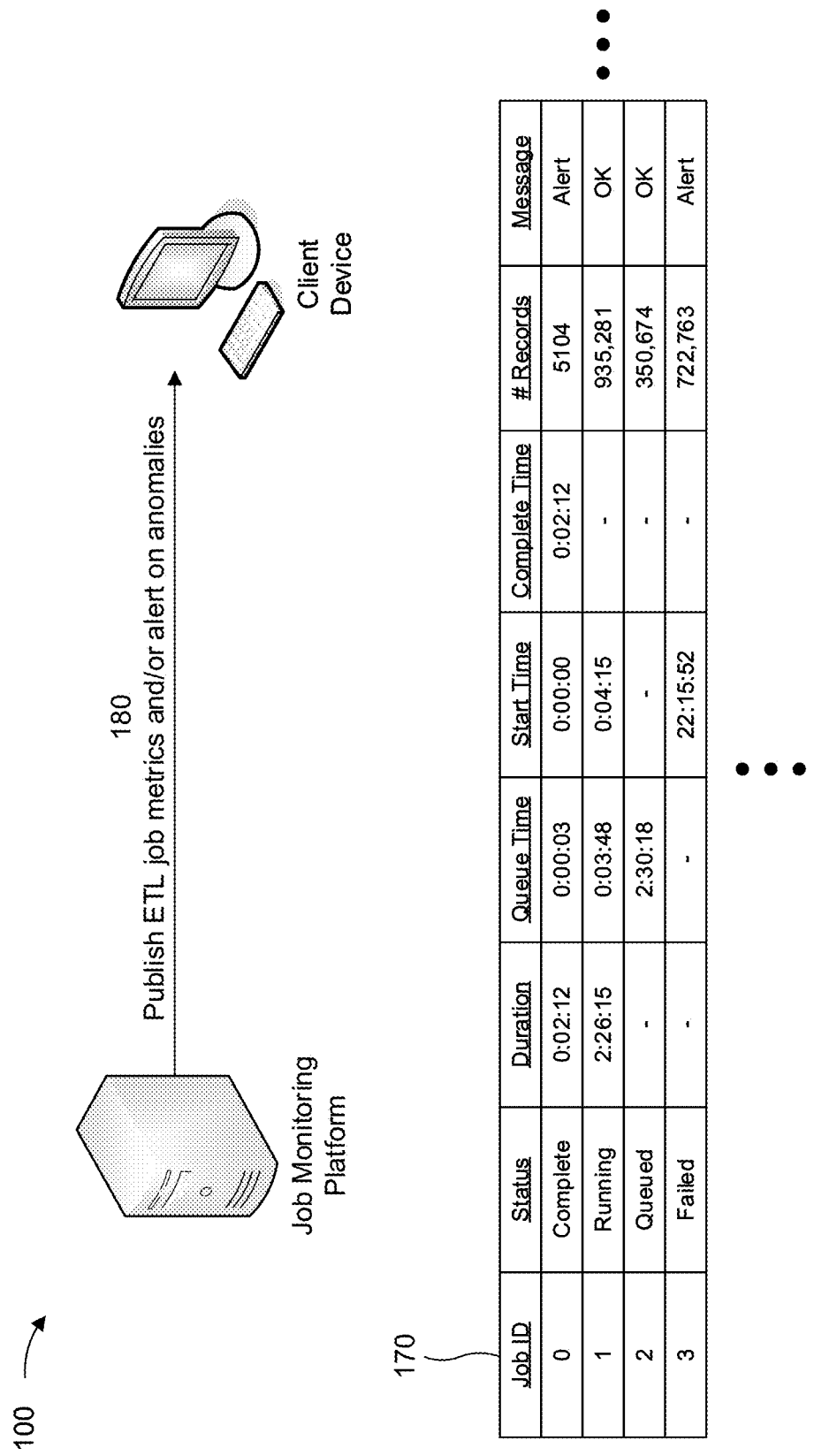

FIGS. 1A-1C are diagrams of an example 100 relating to monitoring ETL jobs and alerting based on a status of the monitored ETL jobs. As shown in FIGS. 1A-1C, example 100 includes a client device, an ETL system, a data source, a data sink, a job monitoring platform, and a credential device. These devices are described in more detail in connection with FIGS. 2-3.

As shown in FIG. 1A, and by reference number 110, the client device may configure one or more ETL jobs in the ETL system. For example, in some implementations, each ETL job that the client device configures in the ETL system may include constituent tasks to extract data records from the data source, transform the data records into a target format, and load the data records in the target format into the data sink. Furthermore, as described in more detail below, one or more of the constituent tasks may include one or more sub-tasks (e.g., the extract task, the transform task, and/or the load task may include one or more sub-tasks). Additionally, or alternatively, the client device may configure one or more ETL jobs that are nested in another ETL job and/or a group of ETL jobs (e.g., an ETL project) that includes multiple ETL jobs to be executed in a concurrent, sequential, and/or interleaved manner. For example, the client device may configure a particular ETL job or group of ETL jobs by indicating various settings associated with different constituent tasks and/or sub-tasks associated with the ETL job(s).

For example, in some implementations, the settings associated with the different constituent tasks and/or sub-tasks associated with the ETL job(s) may include one or more connection settings to define parameters that the ETL system uses to connect to the data source (which may include one or more heterogeneous and/or homogeneous data sources), extraction settings to define queries, commands, and/or other parameters that the ETL system uses to extract data records from the data source, transformation settings to define specific transformation settings to be applied to data records extracted from the data source, lookup settings to define criteria to look up one or more values that correspond to a key in a lookup table that contains one or more key-value pairs, staging settings to prepare (e.g., buffer) transformed data records for loading into the data sink, destination settings to define parameters that the ETL system uses to connect to the data sink (which may include one or more data storage devices), and/or loading settings to define parameters used to load transformed data into the data sink.

Furthermore, in some implementations, when configuring a particular ETL job or group of ETL jobs, the client device may indicate scheduling settings for executing the particular ETL job, the group of ETL jobs, and/or different constituent tasks and/or sub-tasks associated with an ETL job or a group of ETL jobs. For example, in some implementations, the scheduling settings may configure one or more ETL jobs and/or constituent tasks to be executed on-demand, at a particular time, at periodic intervals, and/or when certain triggering criteria are satisfied (e.g., when available resources satisfy a threshold, when a data volume of data records to be extracted, transformed, and/or loaded satisfies a threshold, when a new data source or data sink is connected to the ETL system, and/or when anomalies are detected in the extracted, transformed, and/or loaded data, among other examples). Additionally, or alternatively, the scheduling settings may configure an ETL pipeline in which extraction, transformation, and/or loading tasks are executed. For example, in some implementations, the client device may configure scheduling settings that define dependencies associated with different tasks that are performed within the ETL pipeline to extract, transform, and load data records (e.g., nested ETL jobs or tasks that cannot proceed until one or more ETL jobs or tasks that are earlier in the pipeline have completed) and/or tasks that can be executed in parallel once any preconditions are satisfied.

Accordingly, as further shown in FIG. 1A, and by reference numbers 120-1, 120-2, and 120-3, the client device may configure one or more ETL jobs to execute in the ETL system, and each ETL job may generally include constituent tasks to extract data records from the data source(s), transform the data records into a target format, and load the data records in the target format into the data sink(s). For example, as shown by reference number 120-1, the ETL system may be configured to extract raw data records from the data source(s), which may include structured and/or unstructured data stored in one or more data repositories, cloud environments, on-premises environments, application-specific data repositories, mobile devices, customer relationship management systems, and/or other suitable data sources. In some implementations, the data source(s) may use heterogeneous and/or homogeneous data organizations and/or data formats to store data records, and the extraction task(s) may be configured to ingest data from the data source(s) and convert the extracted data records to a data stream in which the extracted data records have a common format to enable subsequent transformation processing.

Accordingly, as further shown in FIG. 1A, and by reference number 120-2, the ETL system may be configured to perform one or more transformation tasks to apply rules, policies, and/or other functions to the data records extracted from the data source(s) in order to prepare the data records for loading into the data sink(s). For example, in some implementations, the transformation tasks may include data cleansing to remove inconsistencies, missing values, standardization to apply formatting rules to the extracted data records, deduplication to exclude or discard redundant data records, verification to remove unusable data records and/or flag anomalies in the content of the data records, sorting or ordering to organize the data records according to type or other criteria, joining data from multiple data sources, aggregating data to summarize multiple rows of data, and/or transposing or pivoting to convert multiple columns into multiple rows (or vice versa), among other examples. Furthermore, in some implementations, the transformation tasks may include one or more data validation tasks (e.g., sampling data in real-time to verify that transformed data records match an expected output). In such cases, a failed validation may result in a partial or full rejection of the data (or no rejection, depending on context), whereby all, some, or none of the data records may be handed over to the next stage in the ETL pipeline (e.g., loading tasks) depending on the outcome from the validation. Additionally, or alternatively, in the case of a failed data validation, one or more extraction and/or transformation tasks may be re-executed in an effort to correct issues that may have led to the failed data validation.

As further shown in FIG. 1A, and by reference number 120-3, the ETL system may be configured to perform one or more loading tasks to insert, into the data sink(s), transformed data records that have been processed by the tasks in the transformation stage of the ETL pipeline. For example, in some implementations, the loading tasks may be configured to overwrite existing data stored in the data sink(s) with cumulative data and/or to insert new data in a historical form at periodic intervals. Additionally, or alternatively, the loading tasks may be configured to replace, append, and/or supplement data stored in the data sink(s) in a manner that maintains a history and/or audit trail of changes to the data stored in the data sink(s). Furthermore, in some implementations, the loading tasks may be configured to load data records into the data sink(s) all at once based on a full loading configuration and/or at scheduled intervals based on an incremental loading configuration (e.g., depending on available storage and/or processing resources, data volumes to be loaded, and/or other criteria). For example, a full loading configuration may indicate that all data passed from the transformation stage to the loading stage in the ETL pipeline is to be loaded into the data sink(s) as new, unique records, which may be useful for in-depth research purposes. However, a full loading configuration may result in exponential growth in a dataset, which may be difficult to maintain (e.g., potentially causing a failure in the loading stage of the ETL pipeline). Alternatively, an incremental loading configuration may compare incoming data to data already stored in the data sink(s) and produce additional data records to be loaded into the data sink(s) only for new and unique information.

As further shown in FIG. 1A, and by reference number 130, the client device may invoke the job monitoring platform to monitor status information associated with the ETL jobs scheduled in the ETL system. For example, in some implementations, the client device may indicate, to the job monitoring platform, one or more ETL jobs to be monitored, one or more constituent tasks associated with the ETL jobs to be monitored, attributes of the ETL jobs to be monitored, ETL job metrics to be generated based on the monitored attributes of the ETL jobs, alerting thresholds to identify conditions under which end users are to be alerted about potential anomalies associated with the monitored ETL jobs, and/or trends to be identified based on ETL job metrics that are generated for one or more monitored ETL jobs over time. Accordingly, based on the client device invoking the job monitoring platform and configuring appropriate settings associated with the status information to be monitored, the job monitoring platform may execute a cloud compute service that steps through various phases to monitor the ETL jobs that are scheduled in the ETL system, which may include any suitable combination of ETL jobs that have completed, ETL jobs that are currently running, ETL jobs that are currently queued, ETL jobs that have been cancelled, and/or ETL jobs that have failed over one or more ETL sessions.

For example, as shown in FIG. 1B, and by reference number 140, the job monitoring platform may communicate with the credential device to obtain one or more authentication credentials that are used to obtain authenticated access to the ETL system, the data sink, and/or a data analytics service associated with the ETL system, among other examples. For example, in some implementations, the credential device may be a secure device that contains a library of security data, which may include public key certificates, username and password combinations, and/or authentication tokens, among other examples. Accordingly, the job monitoring platform may use the authentication credentials to obtain authenticated access to the ETL system (and therefore the status information associated with the ETL jobs scheduled in the ETL system in the past, present, and/or future), the data sink that stores transformed data records processed by the ETL system, and/or a data analytics service that may be used to perform data analytics on ETL job metrics that are generated based on the status information associated with the ETL jobs.

As further shown in FIG. 1B, and by reference number 150, the job monitoring platform may obtain information related to ETL jobs scheduled in the ETL system, which may include current ETL jobs that may include constituent tasks (and/or sub-tasks) in different stages of the ETL pipeline, pending ETL jobs and/or pending constituent tasks and/or sub-tasks that are queued (e.g., waiting on a previous stage to complete and/or queued behind another process for load balancing and/or while awaiting processing resources to become available) and/or scheduled to be executed in the future or when a triggering event is satisfied, and/or historical ETL jobs (e.g., ETL jobs and/or constituent tasks or sub-tasks that have completed, been cancelled, and/or failed, among other examples). For example, in some implementations, the ETL system may include a task management application program interface (API) that can be used to obtain granular details related to the current, pending, and/or historical tasks scheduled in the ETL system (e.g., task type, associated job, execution environment, current status, queue time, queue duration, start time, end time, execution duration, and/or data volume (e.g., a number of rows or records that the corresponding task is extracting, transforming, and/or loading), among other examples). Accordingly, in some implementations, the job monitoring platform may communicate with the ETL system using the task management API to obtain the information related to the current, pending, and/or historical jobs scheduled in the ETL system.

As further shown in FIG. 1B, and by reference number 160, the job monitoring platform may generate and/or update a set of ETL job metrics based on the information related to the current, pending, and/or historical ETL jobs scheduled in the ETL system. In some implementations, as described herein, the ETL job metrics may generally include status information, timing information, and/or data volume information associated with the ETL jobs and/or the constituent tasks that are associated with extracting, transforming, and loading data records. For example, in some implementations, the job monitoring platform may generate the ETL job metrics by tagging the information obtained from the ETL system to associate each information item with an appropriate status (e.g., running, queued, completed, cancelled, and/or failed) and providing the tagged information to the data analytics service to generate the ETL job metrics, detect anomalies based on the ETL job metrics, and/or identify trends based on the ETL job metrics, among other examples.

For example, as shown in FIG. 1C, and by reference number 170, the ETL job metrics may include an identifier in addition to the status of each ETL job and/or constituent task associated with an ETL job, the ETL job metrics may include an identifier associated with an ETL job or task, a status of the ETL job or task, a duration associated with the ETL job or task (e.g., an execution duration and/or a queued duration), a time when the ETL job or task was queued (if applicable), a time when the ETL job or task started to execute (if applicable), a time when the ETL job or task completed executing (if applicable), a number of data records associated with the ETL job or task, and/or a message related to the ETL job or task (e.g., a status message and/or error). Furthermore, as described herein, the ETL job metrics may be provided at varying levels of granularity to enable anomaly detection and/or trend identification for one or more individual ETL jobs, specific constituent tasks and/or sub-tasks associated with an ETL job, an overall ETL job set that may include one or more ETL jobs, and/or ETL jobs and/or constituent tasks that are nested within another ETL job and/or task. Additionally, or alternatively, the ETL job metrics may include one or more estimations and/or predictions based on historical status information, timing information, data volume information, and/or other metrics associated with past, present, and/or future ETL jobs or tasks. For example, in some implementations, one or more machine learning models may be trained using artificial intelligence techniques to derive patterns based on historical data related to operation of the ETL system (e.g., historical data related to actual queue, start, completion, and/or failure times, numbers of records processed, and/or other ETL job metrics). Accordingly, in some implementations, the one or more machine learning models may output, based on the historical data, a prediction as to whether and/or when a given ETL job or task will be queued, started, and/or completed, cancelled, how long a given ETL job will be queued or executing, and/or how many data records an ETL job or task will extract, transform, and/or load, among other examples.

As further shown in FIG. 1C, and by reference number 180, the job monitoring platform may publish the ETL job metrics and/or generate one or more alerts to indicate when anomalies occur in the ETL job metrics. For example, in some implementations, the job monitoring platform may be configured with various alerting conditions that may define alerting thresholds and/or other criteria that represent potential anomalies in the ETL job metrics. For example, in some implementations, the job monitoring platform may generate a real-time alert to inform one or more end users when an ETL job or a constituent task associated with an ETL job has failed (e.g., indicating a potential breakdown in the ETL pipeline), when an ETL job or constituent task has been queued for a duration that satisfies a threshold (e.g., indicating a potential stall in the ETL pipeline), when a number of data records being processed by a particular ETL job or constituent task satisfies (e.g., is higher or lower than) a threshold, when a particular ETL job or constituent task has been queued or running for a duration that deviates from historical trends, and/or when a particular ETL job or constituent task has a data volume (e.g., a number of data records) that deviates from historical trends (e.g., is a threshold amount more or less than a historical average), among other examples. Accordingly, when an anomaly is identified based on the ETL job metrics satisfying an alerting condition, the job monitoring platform may invoke a messaging service to generate an alert that includes information related to the anomaly. Additionally, or alternatively, the job monitoring platform may be configured to communicate with one or more components in the ETL system to attempt to automatically remediate the anomaly (e.g., requeuing an ETL job or task that has failed or stalled, cancelling a task that has failed or stalled, and/or requeuing and/or cancelling one or more downstream ETL jobs or tasks that depend on an ETL job or task that has failed, among other examples). Additionally, or alternatively, one or more machine learning models may assign a score to the anomaly that indicates a potential level of concern associated with the anomaly, and the messaging service may be invoked (or not invoked) based on the score assigned to the anomaly. In this way, the messaging service may be invoked to alert end users about issues that represent potential breakdowns in the ETL pipeline (e.g., when the score assigned to the anomaly satisfies a threshold) or not invoked for anomalies that may be less severe (e.g., when the score assigned to the anomaly fails to satisfy the threshold).

For example, in some implementations, the alert may include an electronic message (e.g., an email message, a text message, and/or an application-specific notification, among other examples) directed to the client device, which may be associated with one or more users and/or groups of users that may be responsible for remediating the anomaly. Additionally, or alternatively, the alert may be published to a workspace (e.g., a communication platform) accessible to one or more client devices associated with the users and/or groups of users responsible for anomaly remediation. For example, in some implementations, the workspace may be a collaborative workspace that includes one or more chat rooms or channels that are organized by topic (e.g., different ETL job statuses), private groups (e.g., associated with users that may be responsible for managing different stages in the ETL pipeline), and/or direct messaging services to send alerts directly to interested users.

Furthermore, in some implementations, the job monitoring platform may publish the ETL job metrics and/or data analytics associated with the ETL job metrics to the workspace that is accessible to one or more client devices. For example, as described above, the job monitoring platform may derive historical trends that relate to changes (e.g., increases or decreases) in execution durations and/or queued durations over time, changes in the number of data records being processed over time, and/or average times that ETL jobs and/or tasks spend in a running state or a queued state over time, among other examples. In this way, client devices may create and/or interact with one or more dashboards to visualize data analytics associated with the ETL job metrics to capture trends over time and/or proactively monitor the ETL system to identify and/or remediate potential problems before they occur. For example, in one use case, an organization may upgrade storage and/or processing resources and/or divide one or more ETL jobs into more sub-tasks when the ETL job metrics indicate that a data volume (e.g., a number of data records) being extracted, transformed, and/or loaded is steadily growing over time. In another example use case, an organization may upgrade processing resources and/or configure additional stages in the ETL pipeline when the execution duration for a particular ETL job or constituent task repeatedly exceeds a historical average. Accordingly, the job monitoring platform may provide end users with a capability to create and/or interact with various dashboards to visualize data analytics associated with the ETL job metrics in order to identify and remediate potential problems in the ETL pipeline and/or to proactively remediate potential problems in the ETL pipeline before the problems occur. For example, the problems in the ETL pipeline may be attributable to storage, processing, or other resources in an environment of the ETL system that might cause breakdowns and/or stalls in the ETL pipeline, misconfigurations and/or suboptimal configurations of ETL jobs and/or constituent tasks of an ETL job, and/or data corruption in the data source(s) and/or data sink(s), among other examples. Accordingly, in some implementations, the job monitoring platform may be configured to automate one or more remediation actions, such as rebooting or restarting one or more devices in the environment associated with the ETL system, allocating additional storage and/or processing resources to ETL jobs or tasks that may have failed or stalled, and/or decommissioning and/or disabling devices that are associated with ETL jobs that have failed or stalled, among other examples.

As indicated above, FIGS. 1A-1C are provided as an example. Other examples may differ from what is described with regard to FIGS. 1A-1C.

Figure 2:
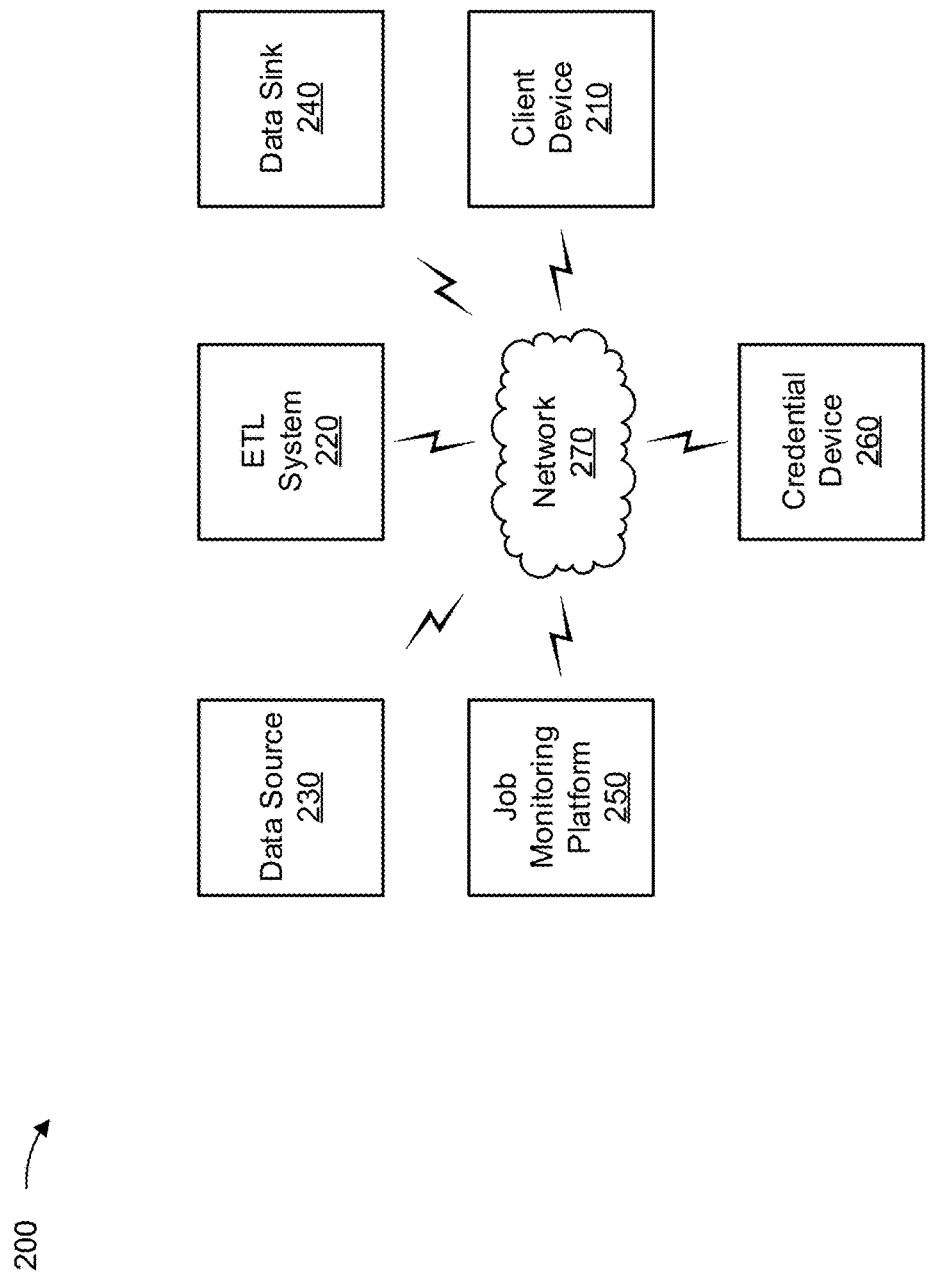
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, an ETL system 220, a data source 230, a data sink 240, a job monitoring platform 250, a credential device 260, and/or a network 270. Devices of environment 200 may interconnect via wired connections and/or wireless connections.

The client device 210 includes one or more devices capable of receiving, generating, storing, processing, and/or providing information associated with one or more ETL jobs, ETL job metrics or other suitable status information associated with one or more ETL jobs, and/or anomalies or trends based on the status information associated with the one or more ETL jobs, among other examples, as described in more detail elsewhere herein. The client device 210 may include a communication device and/or a computing device. For example, the client device 210 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The ETL system 220 includes one or more devices capable of receiving, generating, storing, processing, providing, and/or routing information associated with one or more ETL jobs that are scheduled in the ETL system 220, as described elsewhere herein. The ETL system 220 may include a communication device and/or a computing device. For example, the ETL system 220 may include a server, such as an application server, a client server, a web server, a database server, a host server, a proxy server, a virtual server (e.g., executing on computing hardware), or a server in a cloud computing system. In some implementations, the ETL system 220 includes computing hardware used in a cloud computing environment.

The data source 230 includes one or more devices capable of receiving, generating, storing, processing, and/or providing information associated with one or more ETL jobs (e.g., data records extracted by the ETL system 220), as described elsewhere herein. The data source 230 may include a communication device and/or a computing device. For example, the data source 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 230 may communicate with one or more other devices of environment 200, as described elsewhere herein.

The data sink 240 includes one or more devices capable of receiving, generating, storing, processing, and/or providing information associated with one or more ETL jobs (e.g., data records that have been extracted from the data source 230 and transformed by the ETL system 220), as described elsewhere herein. The data sink 240 may include a communication device and/or a computing device. For example, the data sink 240 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data sink 240 may communicate with one or more other devices of environment 200, as described elsewhere herein.

The job monitoring platform 250 includes one or more devices capable of receiving, generating, storing, processing, providing, and/or routing information associated with monitoring status information associated with one or more ETL jobs that are scheduled in the ETL system 220, as described elsewhere herein. The job monitoring platform

250 may include a communication device and/or a computing device. For example, the job monitoring platform 250 may include a server, such as an application server, a client server, a web server, a database server, a host server, a proxy server, a virtual server (e.g., executing on computing hardware), or a server in a cloud computing system. In some implementations, the job monitoring platform 250 includes computing hardware used in a cloud computing environment The credential device 260 includes one or more devices capable of receiving, generating, storing, processing, providing, and/or routing information associated with authentication credentials that are used to monitor one or more ETL jobs that are scheduled in the ETL system 220, as described elsewhere herein. The credential device 260 may include a communication device and/or a computing device. For example, the credential device 260 may include a server, such as an application server, a client server, a web server, a database server, a host server, a proxy server, a virtual server (e.g., executing on computing hardware), or a server in a cloud computing system. In some implementations, the credential device 260 includes computing hardware used in a cloud computing environment.

The network 270 includes one or more wired and/or wireless networks. For example, the network 270 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 270 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
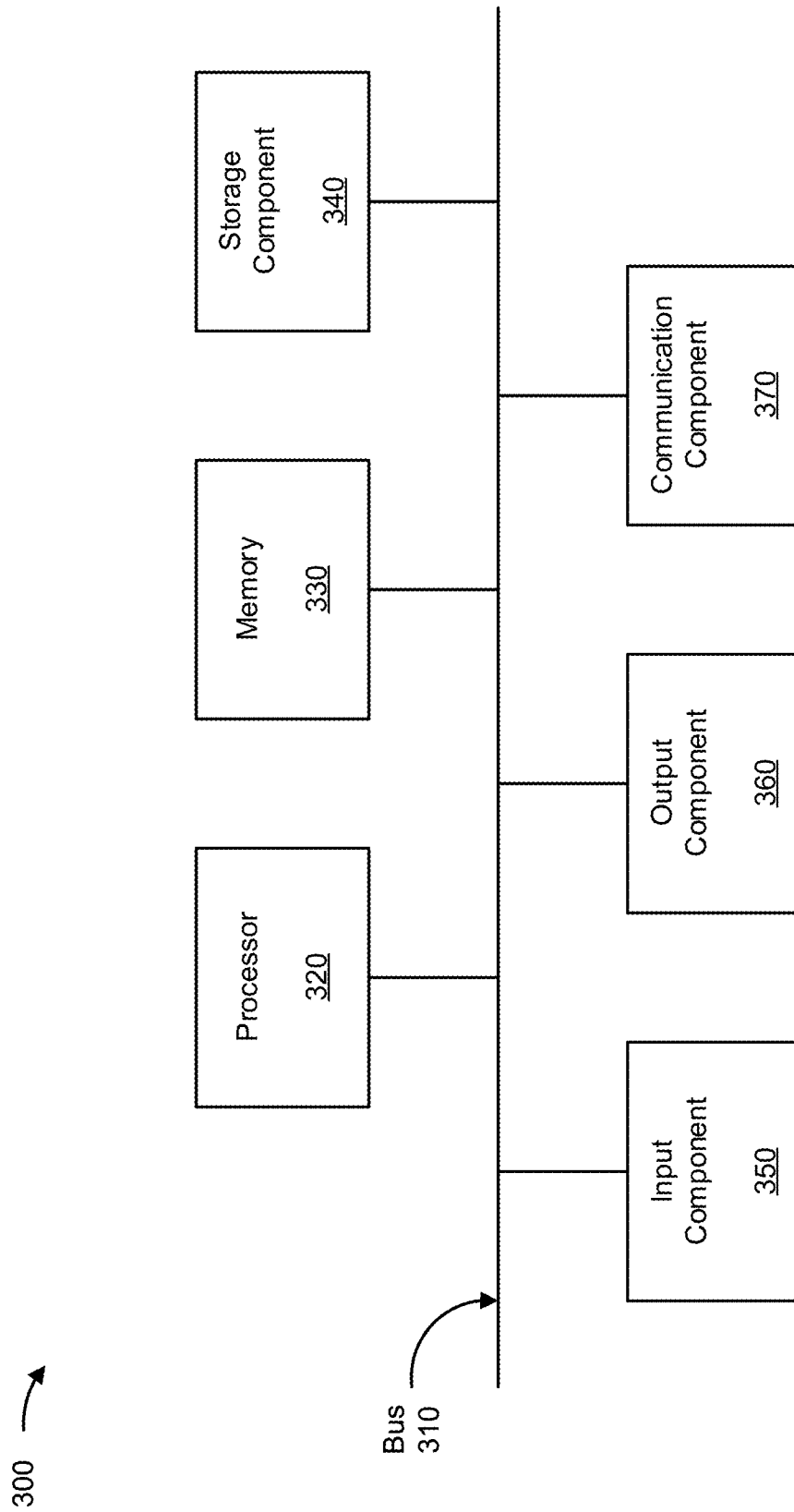
FIG. 3 is a diagram of example components of one or more devices of FIG. 2.

FIG. 3 is a diagram of example components of a device 300, which may correspond to the client device 210, the ETL system 220, the data source 230, the data sink 240, the job monitoring platform 250, and/or the credential device 260 shown in FIG. 2. In some implementations, the client device 210, the ETL system 220, the data source 230, the data sink 240, the job monitoring platform 250, and/or the credential device 260 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with monitoring ETL jobs and alerting based on a status of the monitored ETL jobs. In some implementations, one or more process blocks of FIG. 4 may be performed by a job monitoring platform (e.g., job monitoring platform 250). In some implementations, one or more process blocks of FIG. 4 may be performed by another device or a group of devices separate from or including the job monitoring platform, such as the client device 210, the ETL system 220, the data source 230, the data sink 240, and/or the credential device 260 shown in FIG. 2. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include obtaining information related to one or more ETL jobs scheduled in an ETL system (block 410). In some implementations, the one or more ETL jobs are each associated with constituent tasks to extract data records from a data source, transform the data records into a target format, and load the data records in the target format into a data sink. As further shown in FIG. 4, process 400 may include generating, for the one or more ETL jobs scheduled in the ETL system, ETL job metrics that include status information, timing information, and data volume information associated with extracting, transforming, or loading data records (block 420). As further shown in FIG. 4, process 400 may include identifying an anomaly associated with at least one ETL job, among the one or more ETL jobs scheduled in the ETL system, based on the ETL job metrics (block 430). In some implementations, the anomaly is identified based on the status information, the timing information, or the data volume information associated with the at least one ETL job satisfying one or more conditions. As further shown in FIG. 4, process 400 may include invoking a messaging service to generate, based on the anomaly, an alert that includes information related to the anomaly associated with the at least one ETL job (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for monitoring extract, transform, and load (ETL) jobs, the system comprising:
   one or more memories; and
   one or more processors, coupled to the one or more memories, configured to:
   obtain information related to one or more ETL jobs scheduled in an ETL system, wherein the one or more ETL jobs each include constituent tasks to extract data records from a data source, transform the data records into a target format, and load the data records in the target format into a data sink;
   generate, for the one or more ETL jobs, ETL job metrics that include status information, timing information, and data volume information associated with each of the constituent tasks, the data volume information indicating a quantity of data records to be extracted, transformed, and loaded or a quantity of data records that have been extracted, transformed, and loaded for the one or more ETL jobs,
   wherein the status information indicates whether each constituent task has a queued status, a running status, a completed status, or a failed status, and
   wherein the timing information indicates one or more of a queue time, an execution time, a start time, or a completion time for each constituent task;
   identify an anomaly associated with at least one ETL job, among the one or more ETL jobs, based on the ETL job metrics, wherein the anomaly is identified based at least in part on the data volume information associated with the at least one ETL job deviating from historical trends related to changes over time in the data volume information associated with the at least one ETL job or the constituent tasks associated with the at least one ETL job;
   invoke a messaging service to generate, based on the anomaly, an alert that includes information related to the anomaly associated with the at least one ETL job; and
   automatically remediate the anomaly by causing the ETL system to: requeue or cancel an ETL job, of the at least one ETL job, or requeue or cancel a constituent task, of the constituent tasks,
   requeue or cancel a downstream ETL job or requeue or cancel a downstream constituent task, and
   divide the at least one ETL job into additional sub-tasks based on the data volume information indicating a particular type of change in the quantity of data records over time, wherein the particular type of change indicates that the quantity of data records is growing over time at a particular rate determined based at least in part on the historical trends.

2. The system of claim 1, wherein the anomaly is further identified based at least in part on the status information indicating that the at least one ETL job has failed.

3. The system of claim 1, wherein the anomaly is further identified based at least in part on the status information indicating that the at least one ETL job is queued and the timing information associated with the at least one ETL job indicating a queue time that satisfies a threshold.

4. The system of claim 1, wherein the anomaly is further identified based at least in part on the data volume information indicating that the at least one ETL job is associated with a quantity of data records that satisfies a threshold.

5. The system of claim 1, wherein the ETL job metrics further include the historical trends, the historical trends relating further to changes over time in the timing information associated with the at least one ETL job or the constituent tasks associated with the at least one ETL job.

6. The system of claim 5, wherein the anomaly is further identified based at least in part on the timing information associated with the at least one ETL job or the constituent tasks associated with the at least one ETL job deviating from the historical trends.

7. The system of claim 1, wherein the ETL job metrics include granular metrics for the one or more ETL jobs, an overall job set that includes the one or more ETL jobs, the constituent tasks associated with the one or more ETL jobs, and one or more ETL jobs nested within an ETL job.

8. The system of claim 1, wherein:
the status information indicates whether each constituent task has a completed status, and
the timing information indicates the completion time for each constituent task.

9. The system of claim 1, wherein the one or more processors are configured to:
obtain authenticated access to one or more of the ETL system, the data sink, or a data analytics service using one or more credentials obtained from a secure credential device.

10. The system of claim 1, wherein the downstream ETL job or the downstream constituent task depends on at least one of:
an ETL job, of the at least one ETL job, that has failed or stalled, or
a constituent task, of the constituent tasks, that has failed or stalled.

11. A method for monitoring extract, transform, and load (ETL) jobs, comprising:
obtaining, by a monitoring device, information related to one or more ETL jobs scheduled in an ETL system, wherein the one or more ETL jobs each include constituent tasks to extract data records from a data source, transform the data records into a target format, and load the data records in the target format into a data sink;
generating, by the monitoring device, ETL job metrics that include status information, timing information, and data volume information associated with each of the constituent tasks, the data volume information indicating a quantity of data records to be extracted, transformed, and loaded or a quantity of data records that have been extracted, transformed, and loaded for the one or more ETL jobs;
enabling, by the monitoring device, a capability to create or interact with one or more dashboards to visualize data analytics associated with the ETL job metrics via a workspace accessible to one or more client devices;
invoking, by the monitoring device, a messaging service to publish one or more notifications associated with the ETL job metrics via the workspace, wherein the one or more notifications correspond to a set of users responsible for anomaly remediation; and
automatically remediating an anomaly identified based at least in part on the data volume information associated with at least one ETL job, among the one or more ETL jobs, deviating from corresponding historical trends by causing the ETL system to:
requeue or cancel an ETL job, of the at least one ETL job, or requeue or cancel a constituent task, of the constituent tasks,
requeue or cancel a downstream ETL job or requeue or cancel a downstream constituent task, and
divide the at least one ETL job into additional sub-tasks based on the data volume information indicating a particular type of change in the quantity of data records over time, wherein the particular type of change indicates that the quantity of data records is growing over time at a particular rate determined based at least in part on the corresponding historical trends.

12. The method of claim 11, wherein:
the status information indicates whether each constituent task has a queued status, a running status, a completed status, or a failed status, and
the timing information indicates one or more of a queue time, an execution time, a start time, or a completion time for each constituent task.

13. The method of claim 12, wherein the one or more notifications indicate that the status information for a constituent task, of the constituent tasks, has changed to or from the queued status, the running status, the completed status, or the failed status.

14. The method of claim 12, wherein the one or more notifications indicate that the queue time or the execution time for a constituent task, of the constituent tasks, having the queued status or the running status satisfies a threshold.

15. The method of claim 12, wherein the one or more notifications include at least one notification that is published based on the quantity of data records associated with a constituent task, of the constituent tasks, satisfying a threshold.

16. The method of claim 11, further comprising:
identifying the anomaly associated with at least one ETL job, among the one or more ETL jobs, based on at least two of the ETL job metrics.

17. A non-transitory computer-readable medium storing a set of instructions, the set of instructions comprising:
one or more instructions that, when executed by one or more processors of a device, cause the device to:
obtain scheduling information related to one or more ETL jobs scheduled in an ETL system,
wherein the one or more ETL jobs each include constituent tasks to extract data records from a data source, transform the data records into a target format, and load the data records in the target format into a data sink;
generate ETL job metrics that include status information, timing information, and data volume information associated with the one or more ETL jobs,
wherein the status information indicates whether each constituent task has a queued status, a running status, a completed status, or a failed status, wherein the timing information indicates one or more of a queue time, an execution time, a start time, or a completion time for each constituent task, and wherein the data volume information indicates a quantity of data records to be extracted, transformed, and loaded or a quantity of data records that have been extracted, transformed, and loaded for the one or more ETL jobs;

enable a capability to create or interact with one or more dashboards to visualize data analytics associated with the ETL job metrics via one or more client devices;

automatically remediate an anomaly associated with at least one ETL job, among the one or more ETL jobs, based at least in part on the scheduling information, wherein the anomaly is identified based at least in part on the data volume information deviating from corresponding historical trends, and wherein the anomaly is remediated automatically by causing the ETL system to:

requeue or cancel the at least one ETL job, and divide the at least one ETL job into additional sub-tasks based on the data volume information indicating a particular type of change over time, wherein the particular type of change indicates that the quantity of data records is growing over time at a particular rate determined based at least in part on the corresponding historical trends; and invoke a messaging service to publish an alert to a workspace, wherein the alert corresponds to a set of users responsible for remediating the anomaly.

18. The non-transitory computer-readable medium of claim 17, wherein the workspace is accessible to the one or more client devices, and wherein the alert includes a notification indicating one or more of:

that the status information for a constituent task, of the constituent tasks, has changed to or from the queued status, the running status, the completed status, or the failed status, or that the queue time or the execution time for a constituent task, of the constituent tasks, satisfies a threshold.

19. The non-transitory computer-readable medium of claim 17, wherein to invoke the messaging service, the one or more instructions, when executed by the one or more processors, cause the device to:

invoke the messaging service to publish, to the workspace, a notification based on the quantity of data records associated with a constituent task, of the constituent tasks, satisfying a threshold.

20. The non-transitory computer-readable medium of claim 17, wherein the one or more instructions, when executed by the one or more processors, further cause the device to:

identify the anomaly associated with at least one ETL job, among the one or more ETL jobs, based on at least two of the ETL job metrics; and wherein to automatically remediate the anomaly, the one or more instructions, when executed by the one or more processors, cause the device to:

automatically remediate the anomaly by further causing the ETL system to at least one of:

requeue or cancel a constituent task, of the constituent tasks, that has failed or stalled, requeue or cancel a downstream ETL job that depends on one of:

an ETL job, of the at least one ETL job, that has failed, or a constituent task, of the constituent tasks, that has failed, or requeue or cancel a downstream constituent task that depends on one of:

an ETL job, of the least one ETL job, that has failed, or a constituent task, of the constituent tasks, that has failed.

* * * * *